(12) United States Patent
Parkvall et al.

(10) Patent No.: US 8,351,319 B2
(45) Date of Patent: Jan. 8, 2013

(54) INFORMATION ON REFERENCE SIGNAL STRUCTURE FOR NEIGHBORING CELL MEASUREMENTS

(75) Inventors: Stefan Parkvall, Stockholm (SE); David Astely, Bromma (SE); Erik Dahlman, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 513 days.

(21) Appl. No.: 12/595,304

(22) PCT Filed: Apr. 3, 2008

(86) PCT No.: PCT/SE2008/050388
§ 371 (c)(1), (2), (4) Date: Oct. 27, 2009

(87) PCT Pub. No.: WO2008/127185
PCT Pub. Date: Oct. 23, 2008

(65) Prior Publication Data
US 2010/0118706 A1    May 13, 2010

(30) Foreign Application Priority Data
Apr. 11, 2007    (SE) ...................................... 0700900

(51) Int. Cl.
*H04J 11/00* (2006.01)
(52) U.S. Cl. .......................... 370/203; 370/208; 375/260
(58) Field of Classification Search .................. 370/203, 370/208, 209, 329, 310, 331, 335, 347, 465, 370/431, 432, 441, 442; 455/63.1, 436, 434, 455/450, 502, 553.1; 375/260
See application file for complete search history.

(56) References Cited

U.S. PATENT DOCUMENTS

| | | | |
|---|---|---|---|
| 5,353,332 A | 10/1994 | Raith et al. | |
| 7,574,210 B2 * | 8/2009 | Kim et al. | 455/436 |
| 7,653,393 B2 * | 1/2010 | Kim et al. | 455/437 |
| 7,830,907 B1 * | 11/2010 | Petranovich et al. | 370/436 |
| 7,885,235 B2 * | 2/2011 | Mochizuki et al. | 370/331 |
| 8,249,007 B2 * | 8/2012 | Jading et al. | 370/329 |
| 2004/0131029 A1 * | 7/2004 | Tobe et al. | 370/331 |
| 2005/0032542 A1 | 2/2005 | Wilborn et al. | |
| 2006/0009227 A1 * | 1/2006 | Cudak et al. | 455/450 |
| 2006/0058033 A1 | 3/2006 | Marsan et al. | |

(Continued)

FOREIGN PATENT DOCUMENTS

EP    1944994 A1    7/2008

(Continued)

*Primary Examiner* — Abdullah Riyami
(74) *Attorney, Agent, or Firm* — Coats & Bennett, P.L.L.C.

(57) ABSTRACT

The present invention relates to cellular radio communication and in particular to providing information on neighbor cells to enable terminals to perform neighbor cell measurements. In the prior art the terminal attempts to make neighbor cell measurements in a reference signal structure that is the same in the neighbor cell as in the cell the terminal camps in. The present invention is based on the insight that the reference signal structure may differ between neighboring cell for example in the situation of an MBSFN area that is restricted to a region of all cells of a radio network, or in the situation of TDD mode being applied there may be different regions with different allocation of sub-frames for transmission in the uplink and downlink directions. The present invention solves the problem by broadcast information in a cell indicative of the reference signal structure in neighbor cells.

20 Claims, 6 Drawing Sheets

U.S. PATENT DOCUMENTS

| | | | |
|---|---|---|---|
| 2006/0094363 A1* | 5/2006 | Kang et al. | 455/63.1 |
| 2007/0004423 A1 | 1/2007 | Gerlach et al. | |
| 2007/0117566 A1 | 5/2007 | Khawand et al. | |
| 2007/0167181 A1* | 7/2007 | Ramesh et al. | 455/502 |
| 2007/0248068 A1* | 10/2007 | Onggosanusi et al. | 370/338 |
| 2007/0264933 A1* | 11/2007 | Kang et al. | 455/13.1 |
| 2007/0270273 A1* | 11/2007 | Fukuta et al. | 475/206 |
| 2007/0293229 A1* | 12/2007 | Khan | 455/450 |
| 2008/0144612 A1* | 6/2008 | Honkasalo et al. | 370/370 |
| 2008/0232395 A1* | 9/2008 | Buckley et al. | 370/465 |
| 2008/0232396 A1* | 9/2008 | Buckley et al. | 370/465 |
| 2008/0298339 A1* | 12/2008 | Alamouti et al. | 370/347 |
| 2009/0005058 A1* | 1/2009 | Kazmi et al. | 455/452.1 |
| 2009/0156225 A1* | 6/2009 | Angelow et al. | 455/450 |
| 2009/0175179 A1* | 7/2009 | Stewart et al. | 370/252 |
| 2010/0035611 A1* | 2/2010 | Montojo et al. | 455/434 |
| 2010/0103906 A1* | 4/2010 | Montojo et al. | 370/335 |
| 2010/0315963 A1* | 12/2010 | Jading et al. | 370/252 |
| 2011/0182264 A1* | 7/2011 | Akita et al. | 370/329 |
| 2011/0206009 A1* | 8/2011 | Attar et al. | 370/331 |

FOREIGN PATENT DOCUMENTS

| | | |
|---|---|---|
| EP | 1962535 A1 | 8/2008 |
| WO | 2005122436 A1 | 12/2005 |
| WO | 2008/000914 A1 | 1/2008 |
| WO | 2008/060236 A2 | 5/2008 |

* cited by examiner

FIG. 1

Prior Art

Prior Art

INFORMATION ON REFERENCE SIGNAL STRUCTURE FOR NEIGHBORING CELL MEASUREMENTS

TECHNICAL FIELD OF THE INVENTION

The present invention relates to cellular radio communication and in particular to provide information to mobile terminals that enable the terminals to carry out measurements on cells neighbouring a cell the terminals camp in. The invention also relates to a radio base station adapted for providing the information, a mobile terminal and a method for the mobile terminal.

DESCRIPTION OF RELATED ART

In the forthcoming evolution of the mobile cellular standards like GSM and WCDMA, new transmission techniques like OFDM are likely to occur. Furthermore, in order to have a smooth migration from the existing cellular systems to the new high capacity high data rate system in existing radio spectrum, the new system has to be able to operate in a flexible bandwidth. An example of such a new flexible cellular system is 3G Long Term Evolution (3G LTE) that can be seen as an evolution of the 3G WCDMA standard. This system will use OFDM as the downlink transmission scheme and will be able to operate on bandwidths ranging from 1.25 MHz to 20 MHz. Furthermore, data rates up to 100 Mb/s will be supported on the largest bandwidth. LTE will support both FDD and TDD as uplink/downlink duplexing schemes. Furthermore, LTE will also support multicast/broadcast services (MBSFN) on the same carrier as unicast data.

An essential part in any cellular system is support of mobility, i.e., the possibility to move the connection between the terminal and the network from one cell to another cell. To support this, neighboring cell measurements are used. While the connection is maintained in a serving cell, the terminal measures on some well defined signal in neighboring cells and reports the measurement result to the network. The network can then make a decision, for example based on a signal-to-noise ratio measurement made by the terminal, whether the connection should be moved from the serving cell to a new cell.

In order to carry out downlink coherent demodulation, the mobile terminal needs estimates of the downlink channel. A straightforward way to enable channel estimation in case of OFDM transmission is to insert known reference symbols into the OFDM time-frequency grid. In LTE, these reference symbols are jointly referred to as the LTE downlink reference signals.

Figure 1:
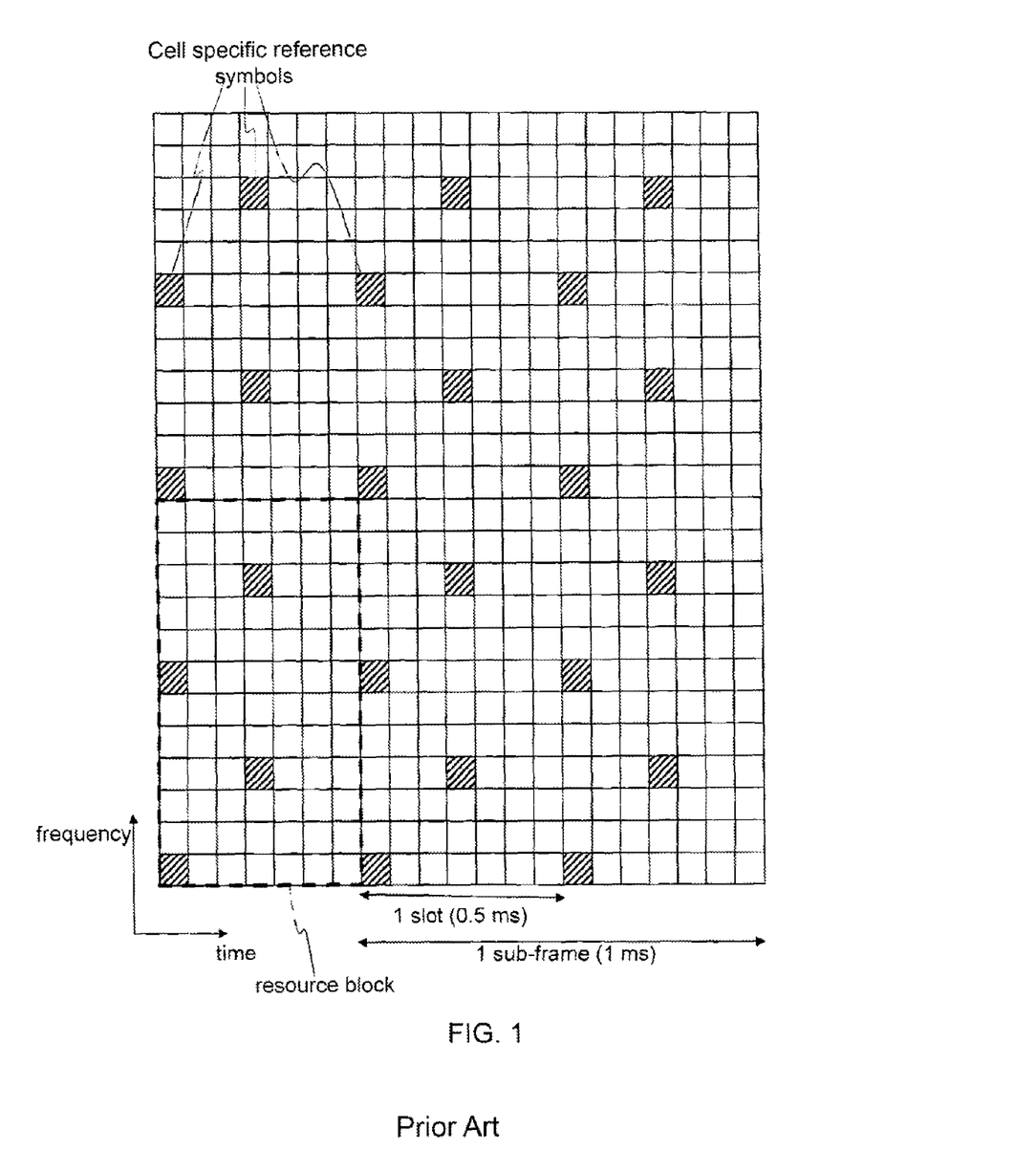
FIG. 1 is a grid in the time frequency domain, with each square in the grid representing an OFDM symbol.

FIG. 1 is grid in the time frequency domain, with each square in the grid representing one subcarrier of one OFDM symbol. It serves to demonstrate the LTE downlink reference-signal structure assuming normal cyclic prefix, i.e. seven OFDM symbols per slot. As illustrated in FIG. 1, downlink reference symbols are inserted within the first and the third last OFDM symbol of each slot and with a frequency-domain spacing of six subcarriers. Furthermore, there is a frequency-domain staggering of three subcarriers between the first and second reference symbols. Within each resource block, consisting of twelve subcarriers during one slot, there are thus four reference symbols. This is true for all sub-frames except sub-frames used for MBSFN-based broadcast/multicast, see further below.

The structure in FIG. 1 illustrates the reference-signal structure for the case of a single antenna. For various multi-antenna transmission techniques, there is typically one reference signal transmitted for each antenna (the term 'antenna port' is used in the 3GPP specifications) and the location of the reference signals for the different antennas may be different.

The reference signals can also be used for other purposes than coherent demodulation. One such example is neighboring cell measurements for mobility, where the terminal measures on the reference signal in neighboring cells to support mobility as described above.

Figure 2:
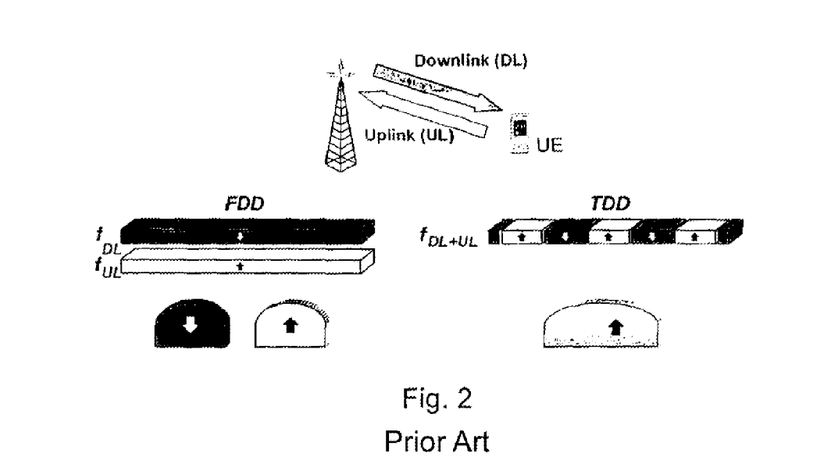
FIG. 2 is an illustration of FDD mode versus TDD mode, with the respective allocation of time and frequency to the uplink and downlink transmissions

One important part of the LTE requirements in terms of spectrum flexibility is the possibility to deploy LTE-based radio-access in both paired and unpaired spectrum, i.e., LTE should support both FDD- and TDD-based duplex arrangements. Frequency Division Duplex (FDD) as illustrated in the left part of FIG. 2, implies that downlink and uplink transmission take place in different, sufficiently separated, frequency bands. Time Division Duplex (TDD), as illustrated in the right part of FIG. 2, implies that downlink and uplink transmission take place in different, non-overlapping time slots. Thus, TDD can operate in unpaired spectrum, whereas FDD requires paired spectrum.

To support TDD operation, a guard time between downlink and uplink timeslots is needed. This can be created by omitting one or several OFDM symbols ("puncturing") in the last sub-frame before the downlink-to-uplink switch. In case a long guard time is needed, some of the reference symbols may need to be punctured in the last sub-frame prior to the switchpoint. The non-punctured part of a subframe used for downlink transmission is sometimes referred to as DwPTS.

Figure 3:
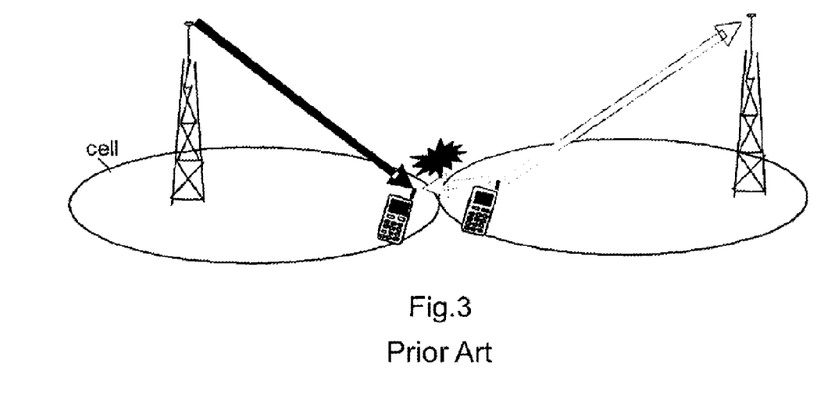
FIG. 3 is a view of two cells and a terminal in each cell illustrating a TDD mode interference situation.

In case of TDD operation, uplink and downlink transmission activity should be coordinated between neighboring cells. If this is not done, uplink transmission in one cell may interfere with downlink transmission in the neighboring cell (and vice versa) as illustrated in FIG. 3. Related to measurements, the terminal should only make neighbouring cell measurements during downlink transmission slots.

Multi-cell broadcast implies transmission of the same information from multiple cells. By exploiting this at the terminal, effectively using signal power from multiple cell sites at the detection, a substantial improvement in coverage, or in higher broadcast data rates, can be achieved. In LTE, this is implemented by not only transmitting identical signals from multiple cell sites, with identical coding and modulation, but by also synchronizing the transmission timing between the cells. Transmitted in this way, the signal at the mobile terminal will appear exactly as a signal transmitted from a single cell site and subject to multi-path propagation. Due to the OFDM robustness to multi-path propagation, such multi-cell transmission, also referred to as Multicast-Broadcast Single Frequency Network (MBSFN) transmission, will then not only improve the received signal strength but also eliminate the inter-cell interference. Thus, with OFDM, multi-cell broadcast/multicast capacity may eventually only be limited by noise and can then, in case of small cells, reach extremely high values.

It should also be noted that the use of MBSFN transmission for multi-cell broadcast/multicast assumes the use of tight synchronization and time alignment of the signals transmitted from different cell sites.

Figure 4:
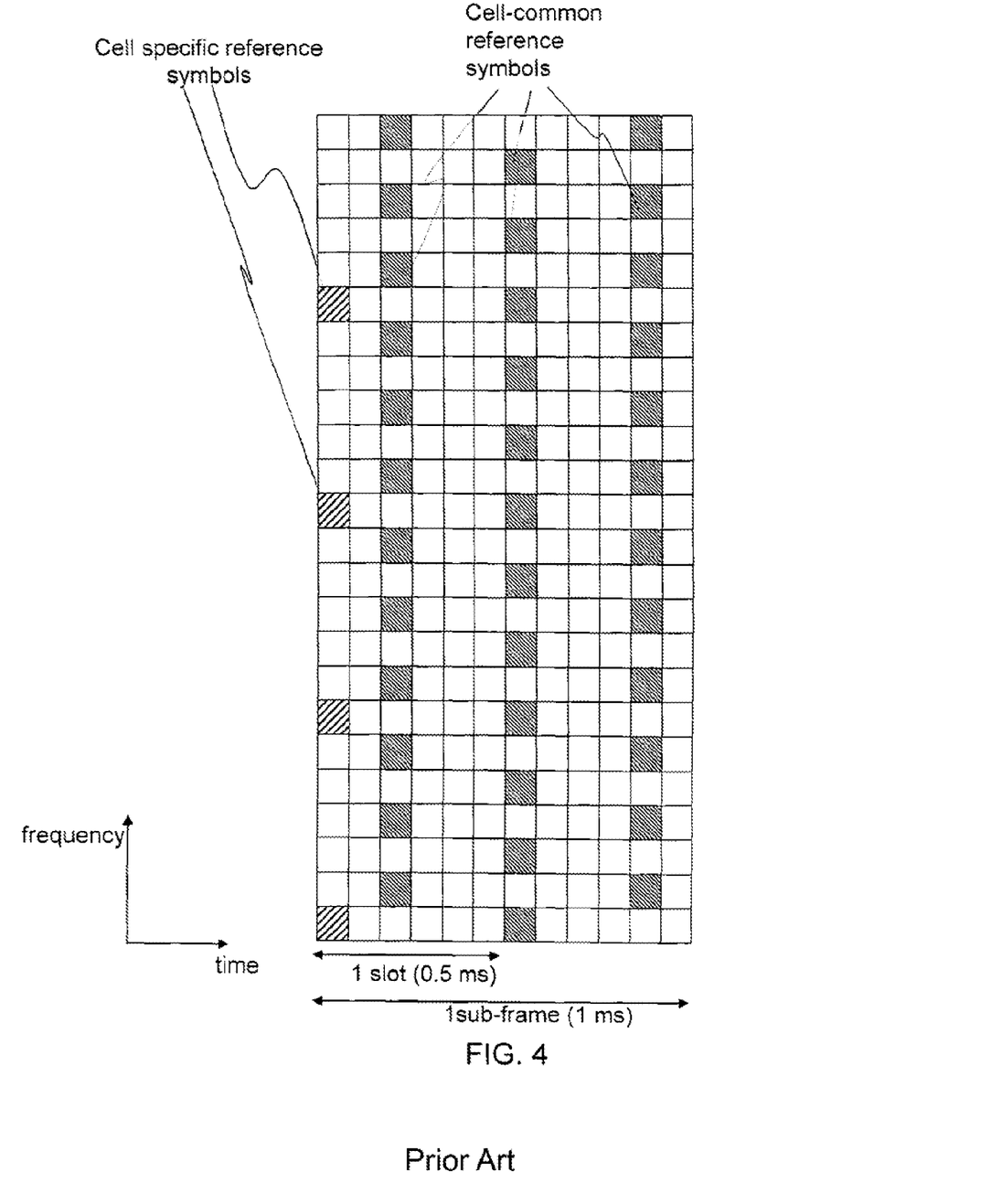
FIG. 4 is the same type of figure as FIG. 1, illustrating a different allocation of symbols for carrying the reference signal.

For MBSFN, a different reference signal structure is used as illustrated in FIG. 4. This is needed as the effective channel seen by the terminal in case of MBSFN transmission appears as more frequency-selective than a single-cell unicast transmission. Thus, as unicast data and MBSFN transmissions are time multiplexed in different time slots, the reference signal structure will differ between slots in case of a mixed carrier transmitting both unicast and MBSFN services. In MBSFN sub-frames, only part of the cell-specific reference signal is present, as it occurs in only some of the first OFDM symbols of the sub-frame. This is disclosed, for example, in FIG. 4. The OFDM symbols carrying cell-specific reference symbols in the MBSFN sub-frame are a sub-set of the symbols used in a normal sub-frame for carrying symbols, as can be concluded by FIG. 4.

Typically, the terminal assumes the same configuration in the neighboring cell as the current cell. In case neighboring cells are configured differently, e.g., different guard times are used in neighboring cells or the MBSFN sub-frame are allocated differently in neighboring cells, the measurements made in the terminal would not correctly reflect the situation.

SUMMARY OF THE INVENTION

The present invention solves the above problem by a method of broadcasting information in a first cell indicative of a sub-frame specific reference signal structure of the neighbouring cells. The purpose of the broadcast information is to enable terminals in the first cell to perform neighbour cell measurements.

The invention also relates to a method for a mobile station that measures the reference signal of a neighbouring cell assuming it has the physical structure indicated by broadcasting in the cell the mobile terminal camps in. The invention also relates to a mobile station adapted for performing the method.

The invention also relates to a radio base station adapted for performing the method.

In one embodiment, TDD access mode is used, and not all neighbour cells have the same allocation of uplink and respectively downlink transmissions in various sub-frames. According to the first embodiment of the invention, only sub-frames used for downlink transmissions by all cells neighbouring the first cell are informed of in broadcasting. Alternatively the downlink sub-frames used by respective neighbour cell is indicated by the first cell.

In a second alternative embodiment, some sub-frame/s is/are used for multi-broadcast transmission in one or more of the neighbouring cells, whereas some other of the neighbour cells or the first cell transmit/s a normal sub-frame structure in the same time window. The multi-broadcast sub-frame has another more restricted allocation of symbols for the cell specific reference signal than for the normal sub-frame reference structure. In the second embodiment is broadcast a structure of a sub-set of symbols allocated to symbols in common for both the multi-broadcast sub-frame and for the normal sub-frame. Thereby the terminal will use only the subset of symbols for measures on the reference signal in the neighbour cells.

An advantage of the invention is a terminal will make attempts to detect reference signals only in symbols that are carrying the reference signal. Thereby it is possible to have different regions of cells within which the same multicast information is broadcast, or within which the same allocation of sub-frames for respectively uplink and downlink transmissions is used. The present invention is particular needed in cells bordering the different regions of cells, to enable the terminals to accurately detect the reference signals of all the neighbour cells.

DESCRIPTION OF PREFERRED EMBODIMENTS

For neighbour cell measurements the cell specific reference signal shall be used. Informing of the reference signal structure to be used for neighbouring cells measurement separately from the configuration in the serving cell provides several benefits.

Figure 5:
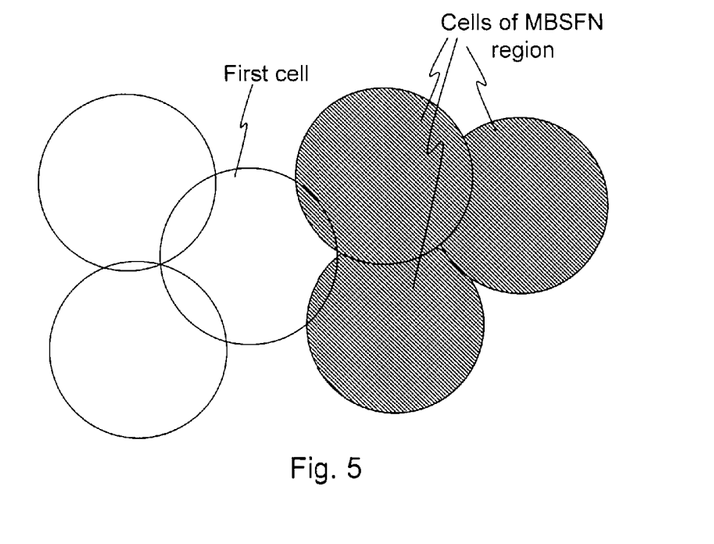
FIG. 5 is a view of cells.

MBSFN transmissions in neighboring cells may use different sub-frames without affecting the possibility to perform accurate neighboring cell measurements. Although using time aligned transmissions for MBSFN is useful in case the full benefits of MBSFN are to be exploited, at the border between different MBSFN regions this is not the case. The invention makes it possible to set up different regions of broadcasting the same MBSFN data. Within a region the same sub-frame allocation is used for broadcasting the MBSFN data. Thereby the broadcasting of information of interest only in a specific geographical area can be restricted to that area. FIG. 5 illustrates a number of cells spread in the geography, some of them included in a MBSFN region. A first cell neighbouring the MBSFN region, transmits normal sub-frames in the same time windows as is used in the MBSFN region for MBSFN sub-frames. Also other cells neighbouring the first cell transmit normal sub-frames in the same time window. The physical structure of the normal frame reference signals is disclosed in FIG. 1. The reference signal structure of MBSFN sub-frames is disclosed in FIG. 4. The symbols allocated to carry the reference signal in the MBSFN sub-frame overlap in their sequential position and on the frequency sub-carrier with symbols used for carrying reference signals in the normal sub-frames. The first cell broadcast information on the reference signal being carried by the symbols as in the structure of MBSFN broadcasting. Terminals camping in the first cell will then attempt to detect the cell specific reference signals according to the structure of the reference signal physical structure in the MBSFN sub-frame for all neighbouring cells albeit some of them transmit normal sub-frames. The symbols that carry cell specific reference signal in a MBSFN sub-frame are also used in a normal sub-frame for the same purpose.

Figure 6:
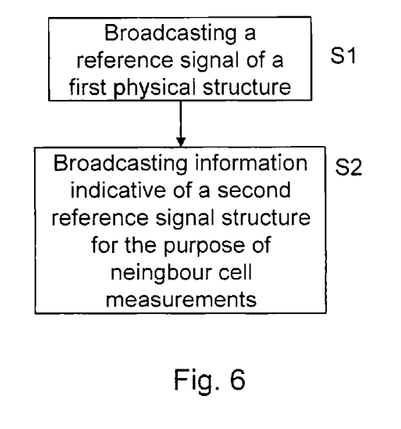
FIG. 6 is a flowchart of method.

FIG. 6 is a flowchart of the method of broadcasting in the first cell, according to the two steps:

Broadcasting a first reference signal, and that has a first physical structure (S1). In the situation described as an example the first cell is not included in the MBSFN region and the first reference signal structure is the structure of the normal sub-frame.

Broadcasting information indicative of a second reference signal structure and that is to be used by terminals for performing neighbour cell measurements.

Figure 7:
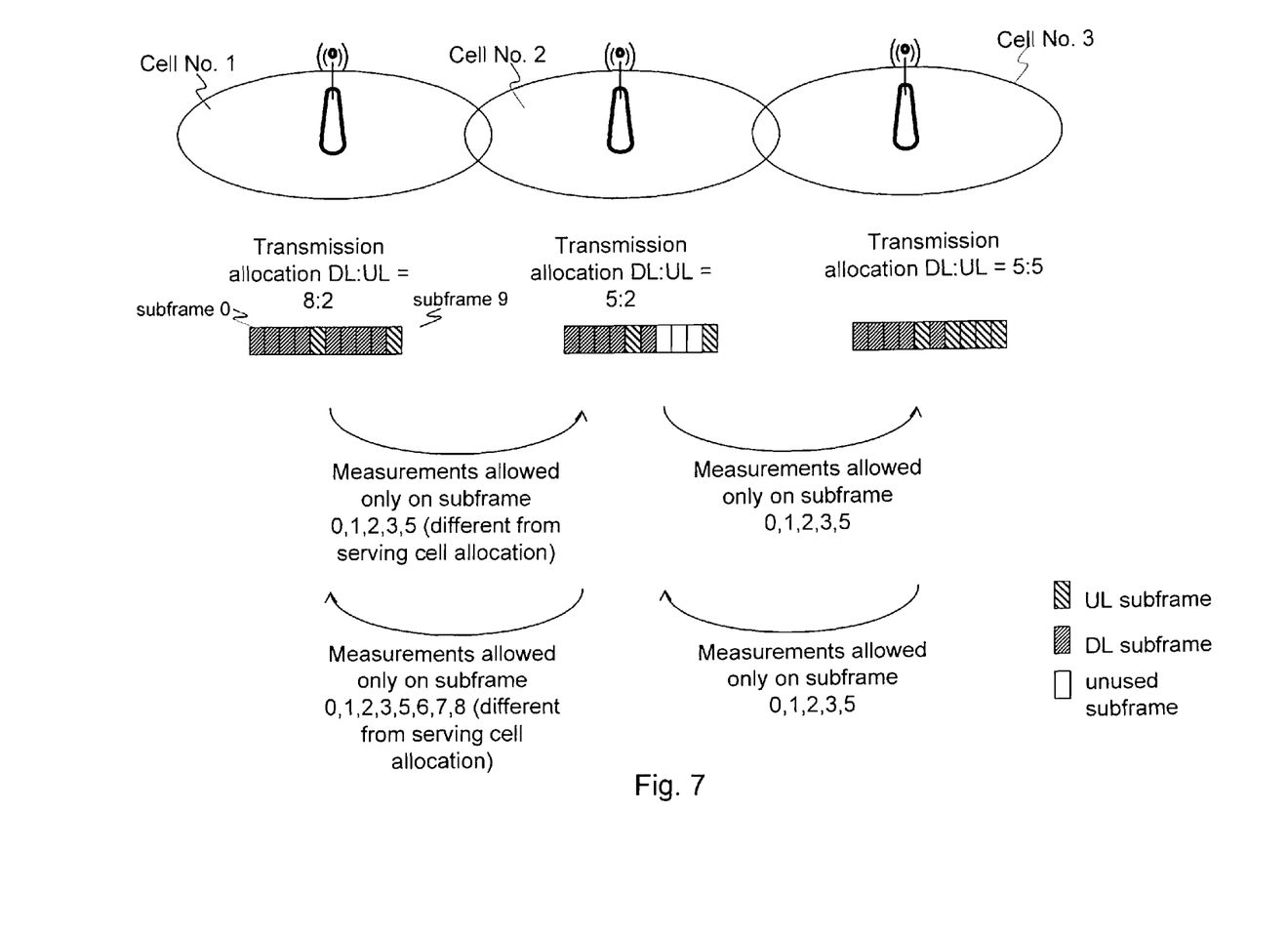
FIG. 7 is an illustration of different allocation of sub-frames for respective uplink and downlink transmissions in three cells.

An alternative embodiment relates to a TDD access mode system when the first cell is located between two regions applying different allocations of sub-frames for respectively UL and DL transmission. A terminal can measure on a neighbour cell only when DL transmission direction is applied in the neighbour cell. When TDD access mode is applied, coordinating the UL and DL transmissions to the same sub-frames in all the cells of a region, and to synchronize the transmissions in the region is advantageous because interference between base stations and between terminals is mitigated. However, there might be a need to differ the balance of allocation of UL resources versus DL resources in response to different demand in different regions. Different uplink-downlink allocations can be used in different cells, assuming proper planning. This is illustrated in FIG. 7, with a three cells, wherein cell No. 1 and cell No. 3 belongs to two different regions with cell no. 2 in between. The three cells have different allocations of sub-frames for respective UL and DL transmission directions. Cell No. 1 to the left have 8 of its 10 sub-frames dedicated for the DL, and they are have the sequential numbers 0, 1, 2, 3, 5, 6, 7, 8, leaving the remaining two sub-frames No. 4 and 9 for the UL direction. A cell No. 2 in the middle of FIG. 5, has 5 sub-frames allocated for the DL direction, i.e. sub-frames numbered 0, 1, 2, 3, 5. Two sub-frames are allocated for the UL direction, they are numbered 4 and 9. Three sub-frames, No. 6-8 are left unused. A cell No. 3, to the right in FIG. 5, has 5 sub-frames each to the UL and to the DL directions. The DL sub-frames are allocated to sub-frames numbers 0, 1, 2, 3, 5 and the remaining sub-frames are allocated to the UL direction. In this case, there is a mechanism to reserve sub-frames to one of the three purposes "uplink", "downlink", or "unused" in contrast to the, in conventional TDD systems, allocation to one of "uplink" or "downlink".

In cell No. 2, the broadcast information on which sub-frames to use for performing neighbour cell measurements, would, in a first alternative be restricted to sub-frames no. 0, 1, 2, 3, 5 because this group is common for both neighbour cell No. 1 and neighbour cell No. 3. Also broadcast information in cell No. 1, and cell No. 3 for measurements on respective neighbours should be restricted to the use of sub-frames No. 0, 1, 2, 3, 5.

In an alternative embodiment the information broadcast by is not only sub-frame specific but also neighbour cell specific. Thus, cell No. 2 broadcast that sub-frames No. 0, 1, 2, 3, 5, 6, 7, 8 are available for measurements on cell No. 1, whereas for measurements on cell No. 3 only sub-frames 0, 1, 2, 3, 5 may be used. This alternative embodiment is also disclosed in the text of FIG. 7.

Also in the case of MBSFN transmission, the sub-frame structure is neighbour cell specific. The information on the reference signal structure is alternatively cell specific for the various neighbour cells.

In the TDD mode, some of the symbols normally used for carrying the reference signals may be punctured for increasing the Guard period between sub-frames for DL to UL transmission. The last reference symbols in the last DL sub-frame may then be lost. The first cell shall then broadcast information of the reference signal physical structure in the same way as is described for the MBSFN embodiment.

It should further be noted that MBSFN transmission may occur both in FDD mode and in TDD mode. In the case of TDD mode information on what sub-frames to use as well as physical reference signal structure within each used sub-frame need be broadcast.

The information indicative of the reference signal structure, need not relate to the all the symbols carrying the reference signals or to all sub-frames used in DL, it may be restricted to sub-frames or to symbols that shall be used by the mobile terminal for making neighbour cell measurements. This is in particular relevant to the embodiments when the information is indicative of the smallest subset of sub-frames or of symbols that are used by all neighbour cells.

Moreover, the broadcast information only need be indicative of a physical structure. For example different classes of physical structures may have been predefined, and the first cell just broadcast the classification of the different sub-frames.

Figure 8:
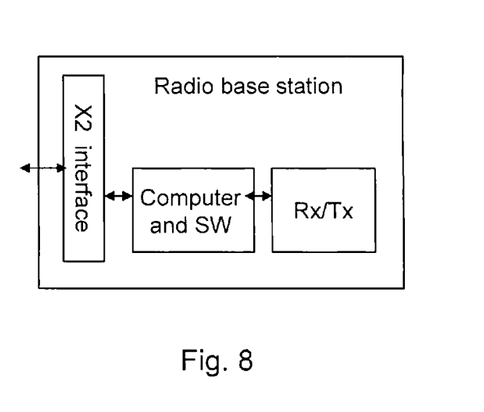
FIG. 8 is a block diagram of a radio base station.

FIG. 8 is a block diagram of a radio base station adapted for performing the invention. The radio base station comprises a radio transceiver including an antenna system, and a data processor controlling the operation of the radio base station according to software. The software is updated to control the broadcasting including an indication of the second reference signal according to the method. The radio base station also comprises an X2 interface for connection to neighbouring radio base station. The signalling information received via the X2 interface is detected by the data processor and the indication of the second reference signal structure as broadcast can be updated autonomously by the radio base station in accordance with information received via the X2 interface.

Figure 9:
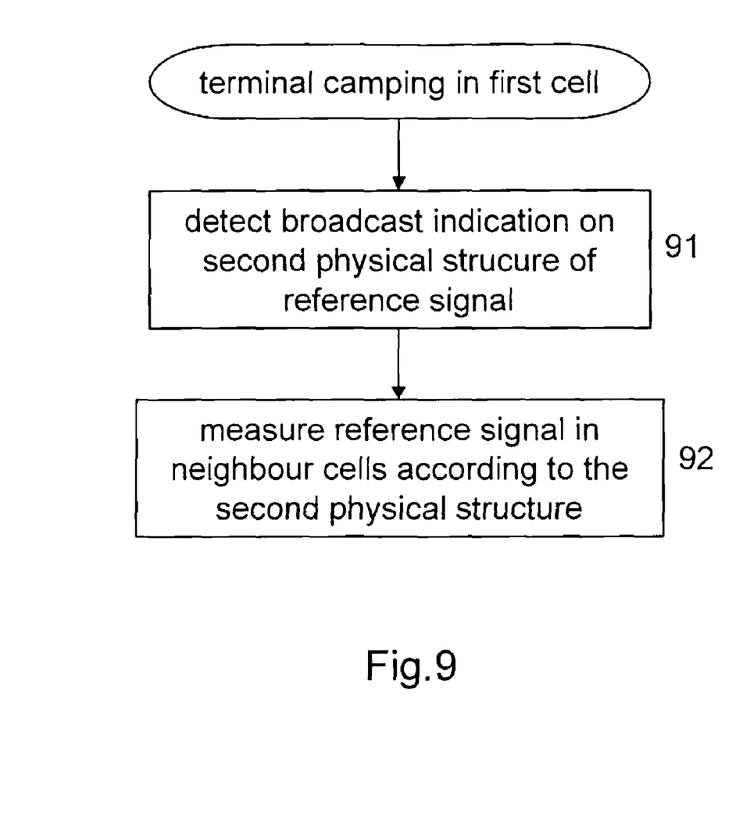
FIG. 9 is a flowchart of a method for a mobile station.

FIG. 9 is a flowchart of the steps performed by a mobile terminal, or UE (User Equipment) as is the name of the LTE mobile terminal. Initially the mobile is camping in a first cell, either in connected mode with the first cell acting serving cell or in idle mode. The first cell transmits a cell specific reference signal according to a first physical structure. In the first step, 91, the mobile terminal reads indication on a second physical structure for a reference signal. The indication is broadcast in the first cell. In a next step, 92, the terminal measures a reference signal in one or more neighbouring cells, assuming the reference signal is carried by symbols according to the indicated second physical structure.

The indication of second physical structure typically indicates one in a predefined a set of physical structures. The mobile terminal as manufactured or as including a SIM-card (Subscription Identity Module), possesses information on the set of possible physical structures for the reference signal.

Figure 10:
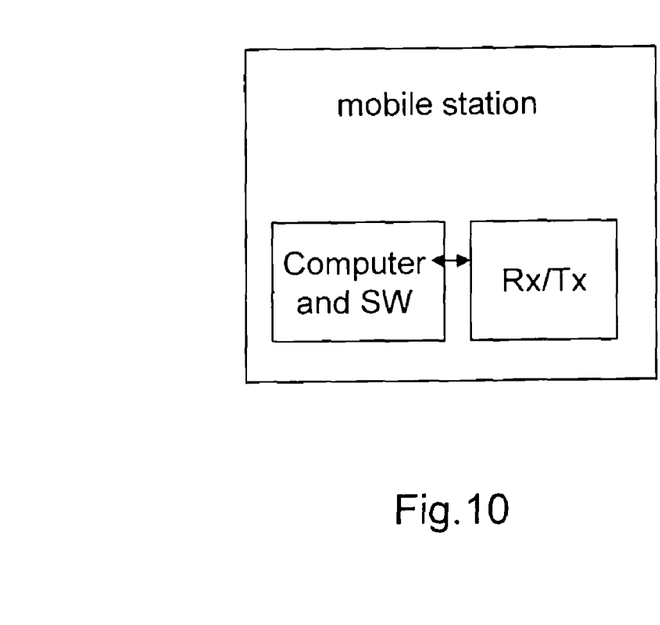
FIG. 10 is a block diagram of a mobile terminal.

FIG. 10 is a block diagram of the mobile terminal. In comprises a transceiver, including an antenna, and computer including software. The computer and software may be distributed and part of it residing in the SIM-card. The software is adapted for detecting the broadcast indication of a the second physical structure of the reference signal, and to control the measuring of reference signal in neighbouring cells to be made on the symbols that is indicated to carry the reference signal.

So far the invention has been described in a LTE system applying a single antenna. The LTE is also standardised for alternative multi-antenna transmission techniques and then typically one reference signal is transmitted for each antenna and the physical structure of symbols assigned for carrying the respective reference signal within the sub-frames, is almost the same. The reference signal structure of antenna 1 is the same as the reference signal for antenna 0 with, the exception of the OFDM symbol is shifted 3 sub-carriers in the frequency domain relative to the symbols on carrier 0. The frame timing on the two antennas is synchronized.

The physical structure of the plural reference signals allocated to multi-antenna cells, is one of the predefined sets of physical structure the mobile terminal possesses information on. Accordingly the multi-antenna system physical structure may be broadcast in a cell, and the mobile terminals assume this physical structure when making neighbour cell measurements.

Abbreviations:
DL downlink
UL uplink
UE User Equipment, i.e. the name of the mobile terminal in the LTE system
MBSFN—a 3GPP specific term used for multibroadcast, i.e. synchronized broadcasting of the same information in a plurality of cells. In some literature this is also referred to as Single-Frequency Network (SFN).

The invention claimed is:

1. A method implemented by a radio base station in an Orthogonal Frequency Division Multiplexing (OFDM) system for assisting one or more mobile terminals in a first cell in measuring a reference signal transmitted in a neighboring cell, the method comprising:
   transmitting a first reference signal carried by a first physical structure that is defined by a particular allocation of sub-frames, and OFDM symbols and sub-carriers within a sub-frame, for carrying the first reference signal; and
   transmitting information indicative of a second physical structure, defined by an allocation different from that of the first physical structure, that carries a second reference signal transmitted in a second cell neighboring the first cell, wherein the information transmitted is not the second reference signal itself.

2. The method of claim 1, wherein the second physical structure carries the second reference signal in particular sub-frames allocated for downlink transmission in the second cell, and wherein transmitting the information indicative of the second physical structure comprises transmitting information indicative of the allocation of sub-frames for downlink transmission in the second cell.

3. The method of claim 2, wherein transmitting the information indicative of the allocation of sub-frames for downlink transmission in the second cell comprises transmitting information indicative of those sub-frames commonly allocated for downlink transmission by all cells neighboring said first cell.

4. The method of claim 1, wherein the second physical structure carries the second reference signal in particular OFDM symbols and sub-carriers predefined for each sub-frame, and wherein transmitting the information indicative of the second physical structure comprises transmitting information indicative of the particular OFDM symbols and sub-carriers predefined for each sub-frame of the second physical structure.

5. The method of claim 4, wherein transmitting the information indicative of the particular OFDM symbols and sub-carriers predefined for carrying the second reference signal in each sub-frame of the second physical structure comprises transmitting information indicative of those particular OFDM symbols and sub-carriers commonly predefined by all cells neighboring said first cell for carrying reference signals.

6. The method of claim 1, wherein the second physical structure carries the second reference signal in particular OFDM symbols and sub-carriers predefined for each sub-frame, wherein each of the sub-frames is allocated for normal transmission or Multicast-Broadcast Single-Frequency Network, MBSFN, transmission, the particular OFDM symbols and sub-carriers predefined for sub-frames allocated for normal transmission differing from those predefined for sub-frames allocated for MBSFN transmission, and wherein transmitting the information indicative of the second physical structure comprises transmitting information indicative of the allocation of sub-frames for MBSFN transmission in the second cell.

7. The method of claim 1, wherein transmitting the information indicative of the second physical structure comprises transmitting one of a plurality of predefined physical structure classifications.

8. The method of claim 1, wherein the first reference signal and the second reference signal are specific to the first cell and the second cell, respectively.

9. The method of claim 1, wherein the second reference signal is measured by the one or more mobile terminals in the first cell.

10. The method of claim 9, wherein transmitting the information indicative of the second physical structure comprises transmitting information indicative of in which sub-frames to measure the second reference signal.

11. The method of claim 9, wherein transmitting the information indicative of the second physical structure comprises transmitting information indicative of in which OFDM symbols within each sub-frame to measure the second reference signal.

12. The method of claim 1, wherein the first and second physical structures carry the first and second reference signals, respectively, in one or more sub-carriers allocated from a set of sub-carriers and in one or more OFDM symbols allocated from a sequence of OFDM symbols within each sub-frame.

13. A radio base station in an Orthogonal Frequency Division Multiplexing (OFDM) system configured to assist one or more mobile terminals in a first cell in measuring a reference signal transmitted in a neighboring cell, the radio base station comprising a transceiver, and a data processor configured to:
   transmit, via the transceiver, a first reference signal carried by a first physical structure that is defined by a particular allocation of sub-frames, and OFDM symbols and sub-carriers within a sub-frame, for carrying the first reference signal; and
   transmit, via the transceiver, information indicative of a second physical structure, defined by an allocation different from that of the first physical structure, that carries a second reference signal transmitted in a second cell neighboring the first cell, wherein the information transmitted is not the second reference signal itself.

14. The radio base station of claim 13, wherein the second physical structure carries the second reference signal in particular sub-frames allocated for downlink transmission in the second cell, and wherein the data processor is configured to transmit the information indicative of the second physical structure by transmitting information indicative of the allocation of sub-frames for downlink transmission in the second cell.

15. The radio base station of claim 13, wherein the second physical structure carries the second reference signal in particular OFDM symbols and sub-carriers predefined for each sub-frame, wherein each of the sub-frames is allocated for normal transmission or Multicast-Broadcast Single-Frequency Network, MBSFN, transmission, the particular OFDM symbols and sub-carriers predefined for sub-frames allocated for normal transmission differing from those predefined for sub-frames allocated for MBSFN transmission, and wherein the data processor is configured to transmit the information indicative of the second physical structure by transmitting information indicative of the allocation of sub-frames for MBSFN transmission in the second cell.

16. The radio base station of claim 13, further comprising an interface communicatively coupled to the data processor and configured to connect the base station to external units for receiving the information indicative of the second physical structure.

17. A method implemented by a terminal in a first cell of an Orthogonal Frequency Division Multiplexing (OFDM) system for measuring a reference signal transmitted in a neighboring cell, the method comprising:
   receiving a first reference signal transmitted in the first cell and carried by a first physical structure that is defined by a particular allocation of sub-frames, and OFDM symbols and sub-carriers within a sub-frame, for carrying the first reference signal;
   detecting information transmitted in the first cell indicative of a second physical structure, defined by an allocation different from that of the first physical structure, that carries a second reference signal transmitted in a second cell neighboring the first cell, the detected information indicative of the allocation of sub-frames of the second physical structure for downlink transmission in the second cell; and
   measuring the second reference signal in sub-frames of the second physical structure that are allocated for downlink transmission in the second cell, according to the detected information.

18. The method of claim 17, wherein said detecting the information transmitted in the first cell indicative of a second physical structure comprises detecting information transmitted in the first cell indicative of which OFDM symbols of the second physical structure carry the second reference signal, and wherein measuring the second reference signal further comprises measuring the second reference signal in the OFDM symbols indicated by the detected information.

19. A mobile terminal comprising,
   a transceiver configured to receive a first reference signal transmitted in the first cell and carried by a first physical structure that is defined by a particular allocation of sub-frames, and OFDM symbols and sub-carriers within a sub-frame, for carrying the first reference signal; and
   one or more processing circuits communicatively coupled to the transceiver and configured to:
      detect information transmitted in the first cell indicative of a second physical structure, defined by an allocation different from that of the first physical structure, that carries a second reference signal transmitted in a second cell neighboring the first cell, the detected information indicative of the allocation of sub-frames of the second physical structure for downlink transmission in the second cell; and
      measure the second reference signal in sub-frames of the second physical structure that are allocated for downlink transmission in the second cell, according to the detected information.

20. The mobile terminal of claim 19, wherein the one or more processing circuits are further configured to detect the information transmitted in the first cell indicative of which OFDM symbols of the second physical structure carry the second reference signal, and to measure the second reference signal by measuring the second reference signal in the OFDM symbols of the second physical structure as indicated by the detected information.

* * * * *

UNITED STATES PATENT AND TRADEMARK OFFICE
CERTIFICATE OF CORRECTION

PATENT NO. : 8,351,319 B2
APPLICATION NO. : 12/595304
DATED : January 8, 2013
INVENTOR(S) : Parkvall et al.

It is certified that error appears in the above-identified patent and that said Letters Patent is hereby corrected as shown below:

On the Title Page, in the Figure, for Tag "S2", in Line 5, delete "neingbour" and insert -- neighbour --, therefor.

In the Drawings
In Fig. 6, Sheet 4 of 6, for Tag "S2", in Line 5, delete "neingbour" and insert -- neighbour --, therefor.

In the Specification
In Column 3, Lines 6-7, delete "concluded by FIG. 4." and insert -- concluded by comparing FIG. 1 and FIG. 4. --, therefor.

In Column 5, Line 24, delete "they are have" and insert -- they have --, therefor.

Signed and Sealed this
Eleventh Day of June, 2013

Teresa Stanek Rea
*Acting Director of the United States Patent and Trademark Office*